US011507285B1

(12) United States Patent
Perry et al.

(10) Patent No.: US 11,507,285 B1
(45) Date of Patent: Nov. 22, 2022

(54) SYSTEMS AND METHODS FOR PROVIDING HIGH-PERFORMANCE ACCESS TO SHARED COMPUTER MEMORY VIA DIFFERENT INTERCONNECT FABRICS

(71) Applicant: TORmem Inc., San Jose, CA (US)

(72) Inventors: Carl Perry, Round Rock, TX (US); Andrew Hodges, Peachtree Corners, GA (US); Scott Burns, Carson City, NV (US); Steven White, Morgantown, WV (US); Thao An Nguyen, San Jose, CA (US)

(73) Assignee: TORmem Inc., San Jose, CA (US)

( * ) Notice: Subject to any disclaimer, the term of this patent is extended or adjusted under 35 U.S.C. 154(b) by 0 days.

(21) Appl. No.: 17/673,607

(22) Filed: Feb. 16, 2022

Related U.S. Application Data

(60) Provisional application No. 63/225,258, filed on Jul. 23, 2021, provisional application No. 63/187,754, filed on May 12, 2021.

(51) Int. Cl.
*G06F 3/06* (2006.01)
(52) U.S. Cl.
CPC ............ *G06F 3/0622* (2013.01); *G06F 3/064* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 10,515,014 B1* | 12/2019 | Himelstein | G06F 12/0842 |
| 2020/0371692 A1* | 11/2020 | Van Doorn | G06F 3/0631 |
| 2021/0056057 A1* | 2/2021 | Huang | G06F 13/28 |
| 2021/0075892 A1* | 3/2021 | Chun | H04L 69/163 |
| 2021/0232338 A1* | 7/2021 | Benisty | G06F 3/061 |
| 2022/0100247 A1* | 3/2022 | Garg | G06F 13/20 |
| 2022/0155965 A1* | 5/2022 | Smith | G06F 3/067 |
| 2022/0174094 A1* | 6/2022 | Subbiah | G06F 3/0679 |

* cited by examiner

*Primary Examiner* — Charles Rones
*Assistant Examiner* — Jonah C Krieger
(74) *Attorney, Agent, or Firm* — Ansari Katiraei LLP; Arman Katiraei; Sadiq Ansari

(57) ABSTRACT

Disclosed is a controller for a disaggregated memory device. The controller may receive a request to allocate memory of a specific size from the disaggregated memory device to a computing device, and may generate a memory block device in the specific size from a memory pool formed from physical memory modules configured on the disaggregated memory device. The controller may expose the memory block device to the computing device as a Non-Volatile Memory Express ("NVMe") target device, and may control access to the memory block device by converting NVMe access requests in a first format from the computing device to access requests in a different second format supported by the memory block device.

20 Claims, 8 Drawing Sheets

SYSTEMS AND METHODS FOR PROVIDING HIGH-PERFORMANCE ACCESS TO SHARED COMPUTER MEMORY VIA DIFFERENT INTERCONNECT FABRICS

BACKGROUND

Servers and other computing devices have a limited amount of Random Access Memory ("RAM") or memory. The amount of memory may determine how much data is readily and quickly accessible to the one or more processors of a computing device. Once the memory is filled, applications and/or other data may be moved to a slower storage medium such as disk, and/or moved to a storage medium that may fail after several program/erase ("P/E") cycles. Increasing the amount of memory typically requires adding Dual In-line Memory Modules ("DIMMs") or physical memory modules to the motherboard of the computing device so that the memory may be detected by the computing device operating system ("OS") and may be made locally accessible to the computing device processors.

DETAILED DESCRIPTION OF PREFERRED EMBODIMENTS

The following detailed description refers to the accompanying drawings. The same reference numbers in different drawings may identify the same or similar elements.

Provided are systems and methods for providing high-performance access to shared computer memory via different interconnect fabrics. The systems and methods may include creating a vast memory pool in at least one disaggregated memory device that is configured with multiple Dual In-line Memory Modules ("DIMMs"), Random Access Memory ("RAM") modules, and/or other physical memory modules. The systems and methods may further include dynamically allocating different blocks of memory from the vast memory pool, and configuring each allocated memory block as an extension of the local or physical memory of a different server or computing device, a memory paging space, a swap space, and/or other high-performance cache or buffer with unlimited program/erase ("P/E") cycles. Consequently, the memory of the computing device may be scaled without adding DIMMs, RAM modules, or other physical memory module to the computing device and/or without modifying the operation of the computing device operating system ("OS"). In other words, the computing device OSes may access the shared memory blocks and local memory using the same calls, commands, and instructions.

Moreover, the systems and methods may support different lightweight, low latency, and high-speed interconnect fabrics and/or transport mechanisms for directly accessing the remote memory blocks so that performance and latency associated with accessing the remote memory blocks is commensurate with accessing local onboard memory of a computing device rather than performance and latency associated with accessing slower disk storage devices or remotely connected storage media. In some embodiments, the interconnect fabrics may include Ethernet, InfiniBand, Peripheral Component Interconnect express ("PCIe"), and/or other communication or networking interfaces for connecting different components or computing devices. In some embodiments, the supported transport mechanisms may include Transmission Control Protocol ("TCP"), Remote Direct Memory Access ("RDMA"), and/or other protocols by which the computing devices may access the shared memory blocks of the disaggregated memory device without the intervention of a processor, OS kernel, and/or various layers of a network protocol stack.

Figure 1:
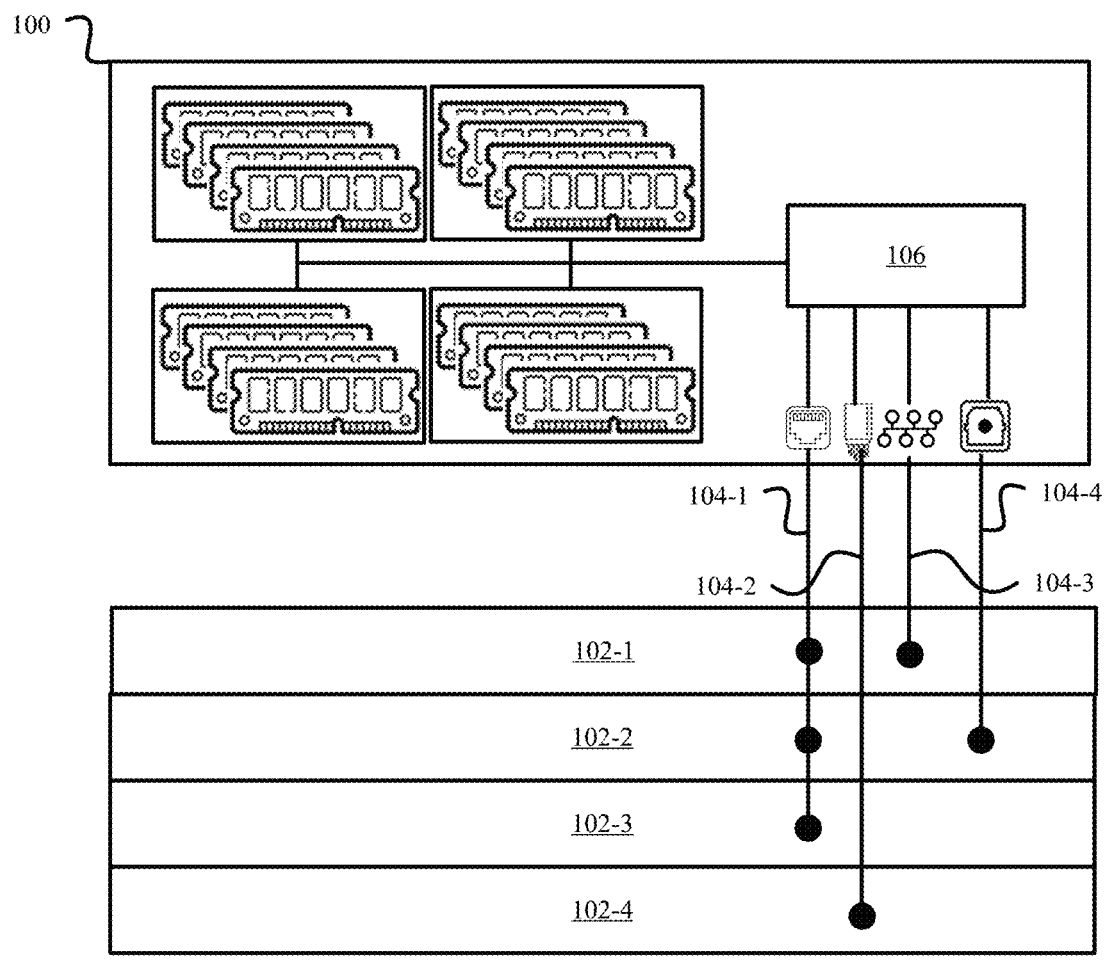
FIG. 1 presents an example architecture that provides access to different memory allocations from a shared memory pool via different transports over different interconnect fabrics in accordance with some embodiments presented herein.

FIG. 1 presents an example architecture that provides access to different memory allocations from a shared memory pool via different transports over different interconnect fabrics in accordance with some embodiments presented herein. The example architecture may include disaggregated memory device 100, servers or computing devices 102-1, 102-2, 102-3, and 102-4 (hereinafter sometimes collectively referred to as "computing devices 102" or individually as "computing device 102"), and interconnect fabrics 104-1, 104-2, and 104-3 (hereinafter sometimes collectively referred to as "interconnect fabrics 104" or individually as "interconnect fabric 104") connecting disaggregated memory device 100 to computing devices 102.

Disaggregated memory device 100 may include a plurality of DIMMs, RAM modules, and/or other physical memory modules that collectively form a vast memory pool. For instance, disaggregated memory device 100 may include tens of physical memory modules that collectively form a memory pool that is several gigabytes or terabytes in size. In some embodiments, the physical memory modules may be uniform in terms of size and performance. For instance, disaggregated memory device 100 may be configured with 16 Double Data Rate 5 Synchronous Dynamic Random-Access Memory ("DDR-5 SDRAM") modules with a clock rate of 6,000 megahertz and capacity of 32 gigabytes each. In some other embodiments, disaggregated memory device 100 may be configured with banks of different memory modules. For instance, a first bank of disaggregated memory device 100 may contain 8 DDR-4 SDRAM modules operating at a first speed or clock and with a first amount of capacity, and a second bank of disaggregated memory device 100 may contain 8 DDR-5 SDRAM modules operating at a faster second speed or clock and with a larger second amount of capacity.

Disaggregated memory device 100 may include controller 106 and one or more interfaces or ports for each interconnect fabric 104. In some embodiments, controller 106 may include a custom Application-Specific Integrated Circuit ("ASIC"), a custom-configured Field Programmable Gate Array ("FPGA"), or other processor that is adapted or configured to provide computing devices 102 with high-performance access to the memory pool of disaggregated memory device 100 via different interconnect fabrics 104.

Computing devices 102 may include servers or other devices that may run independent of one another, or that may operate collectively towards the completion of a common task. For instance, different users may configure and run different tasks on each computing device 102. In some embodiments, computing devices 102 may include devices that are operated by a cloud, compute, or other hosting provider, and that are configured to perform different tasks at different times. Computing devices 102 may be located in the same rack as disaggregated memory device 100, and/or may be connected to disaggregated memory device 100 via different interconnect fabrics 104.

Each computing device 102 may include its own set of processor, memory, disk, network, and/or other hardware resources. However, rather than install a large of amount of memory (e.g., one terabyte of memory) on each computing device 102, each computing device 102 may include a smaller amount of onboard physical memory (e.g., 16 gigabytes of memory) that may be dynamically scaled to a much larger amount (e.g., one terabyte of memory) via the shared memory blocks allocated from disaggregated memory device 100.

In some embodiments, interconnect fabric 104-1 may correspond to an Ethernet fabric with computing device 102-1, computing device 102-2, computing device 102-3, and disaggregated memory device 100 as different endpoints that may be directly connected or indirectly connected via one or more switches, routers, and/or other network equipment. In some embodiments, interconnect fabric 104-2 may correspond to an InfiniBand fabric with computing device 102-4 and disaggregated memory device 100 as different endpoints that may be directly connected or indirectly connected via one or more switches, routers, and/or other network equipment. In some embodiments, interconnect fabric 104-3 may correspond to a PCIe fabric that connects computing device 102-1 to disaggregated memory device 100 directly or indirectly via a PCIe switch. The PCIe fabric may support one or more PCIe versions (e.g., version 4, 5, or 6). Interconnect fabric 104-4 may include another network, bus, or communication medium with which computing device 102-2 is communicably coupled to disaggregated memory device 100. Accordingly, computing devices 102 may be connected to disaggregated memory device 100 using one or more different interconnect fabrics 104. In some embodiments, interconnect fabrics 104 may include other network or communication interfaces (e.g., Fibre Channel) besides Ethernet, InfiniBand, and PCIe.

Figure 2:
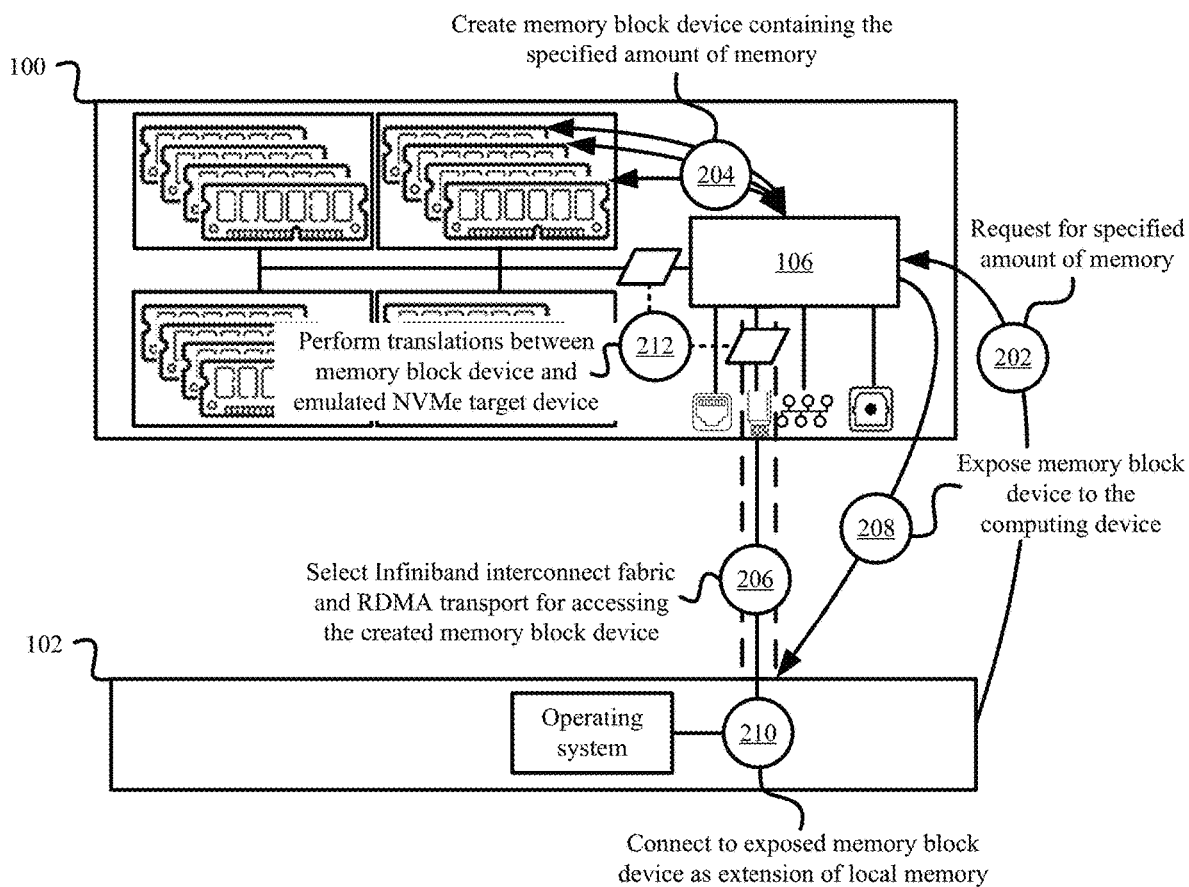
FIG. 2 illustrates a memory allocation example from the memory pool of a disaggregated memory device to a computing device in accordance with some embodiments presented herein.

FIG. 2 illustrates a memory allocation example from the memory pool of disaggregated memory device 100 to computing device 102 in accordance with some embodiments presented herein. As shown in FIG. 2, controller 106 may receive (at 202) a request to allocate a specified amount of RAM or memory to computing device 102.

Controller 106 may create (at 204) a memory block device of the requested size (e.g., the specified amount of memory) within the memory pool. Creating (at 204) the memory block device may include allocating a memory address range from the memory pool that is equal to the specified amount of memory requested for computing device 102, and reserving that allocation for use by computing device 102.

Controller 106 may select (at 206) an interconnect fabric 104 that is supported by disaggregated memory device 100 and computing device 102, and a transport that is supported by both endpoints for the transfer of data over the selected interconnect fabric 104. If multiple interconnect fabrics 104 and/or transports are supported by disaggregated memory device 100 and computing device 102, controller 106 may select the interconnect fabric 104 and/or transport with the fastest performance, largest bandwidth, lowest latency, and/or least communication overhead. For instance, controller 106 may select an InfiniBand interconnect fabric over an Ethernet interconnect fabric, and may select RDMA transport over TCP transport when both interconnect fabrics 104 and transports are supported by both endpoints.

Controller 106 may expose (at 208) the memory block device to computing device 102 using the Non-Volatile Memory Express ("NVMe") protocol. Specifically, controller 106 may expose (at 208) the memory block device as an emulated NVMe target device, wherein the emulated NVMe target device appears to computing device 102 as a flash, solid-state, magnetic, and/or other non-volatile storage device that supports the NVMe protocol despite the emulated NVMe target device being entirely comprised of volatile memory. Exposing (at 208) the memory block device may include notifying computing device 102 of the selected interconnect fabric and transport to use for access to the emulated NVMe target device. For instance, controller 106 may notify computing device 102 that the emulated NVMe target device may be accessed via a specific port of the selected interconnect fabric 104.

Computing device 102 may connect (at 210) to the NVMe target device such that the OS of computing device 102 uses the NVMe target device as extended local memory, a swap space for local memory overflows, or a high performance cache or write buffer for frequently accessed or modified data. For instance, the NVMe protocol may directly connect the emulated NVMe target device to one or more of the processors and/or memory subsystems of computing device 102.

Controller 106 may perform (at 212) translations for seamlessly accessing the memory block device as a NVMe target device. For instance, controller 106 may convert read and write requests issued by computing device 102 to the NVMe target device into read and write requests that may be executed by the memory block device (e.g., a RAM disk device), and may convert formatting of the data returned by the memory block device into a NVMe supported data format. In this manner, controller 106 may provide access to an emulated NVMe target device that has the performance and latency of local memory and that can be easily incorporated as extended local memory, swap space, or fast cache or buffer by existing OSes without any change to the OSes.

Figure 3:
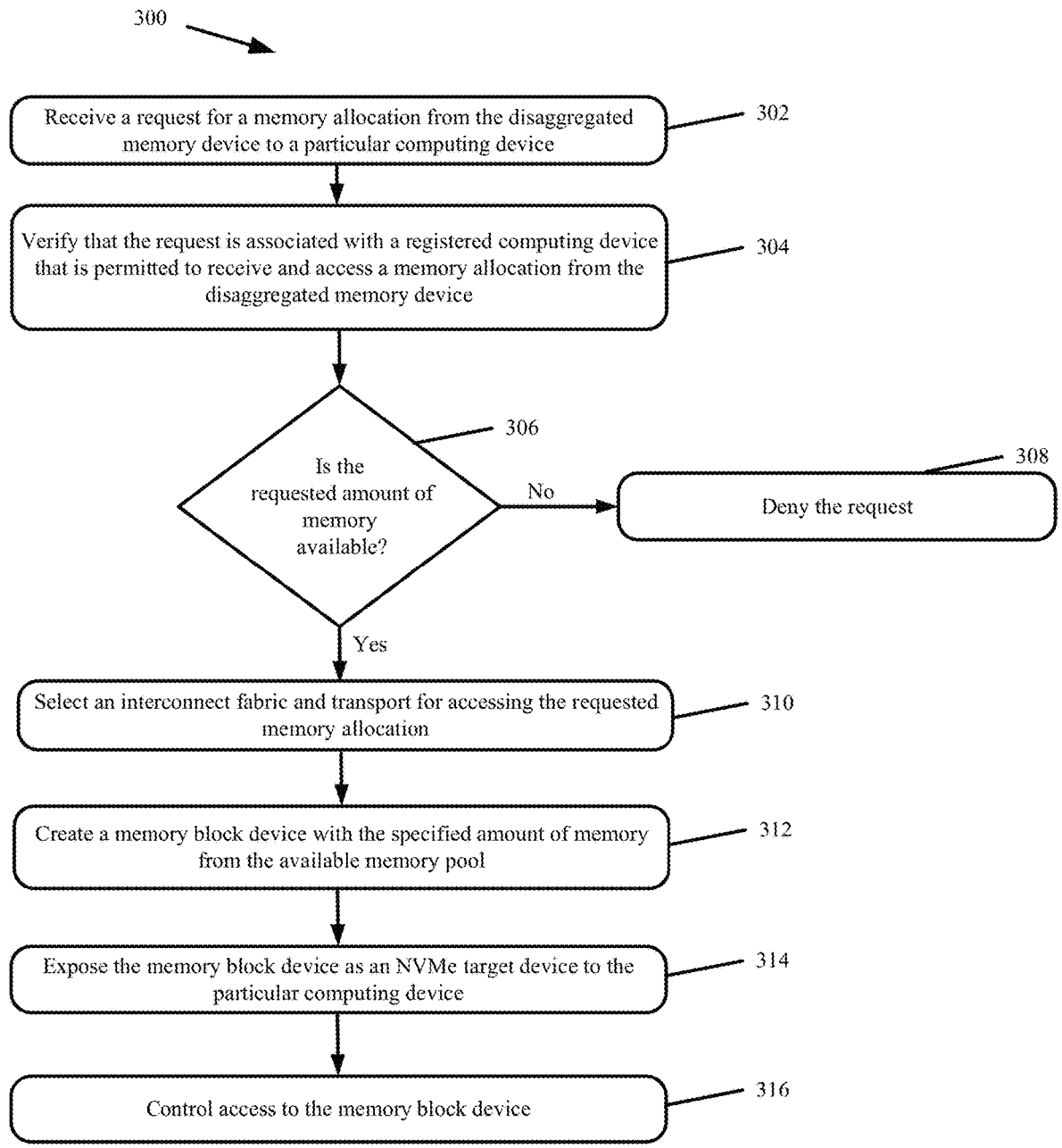
FIG. 3 presents a process for providing high-performance access to a shared memory pool over different interconnect fabrics in accordance with some embodiments presented herein.

FIG. 3 presents a process 300 for providing high-performance access to a shared memory pool over different interconnect fabrics in accordance with some embodiments presented herein. Process 300 may be implemented on disaggregated memory device 100 and/or by controller 106 of disaggregated memory device 100.

Process 300 may include receiving (at 302) a request for a memory allocation from disaggregated memory device 100 to a particular computing device. The request may include one or more identifiers or unique signatures of the particular computing device, may specify a specified amount of memory to allocate from the memory pool of disaggregated memory device 100, and may specify one or more interconnect fabrics and transports that are supported or preferred by the particular computing device. For instance, the request may be for a 512 gigabyte memory allocation to be accessed over an InfiniBand fabric using RDMA transport. In some embodiments, the request may specify one or more of InfiniBand, Ethernet, Fibre Channel, PCIe version X, and/or other interconnect fabrics, and/or may specify one or more of TCP, RDMA, PCI, and/or other transports for communication over the specified interconnect fabric.

The request may be issued as a HyperText Transfer Protocol ("HTTP") message to an Internet Protocol ("IP") or other network address of disaggregated memory device 100. In some embodiments, the request may be issued directly from the particular computing device. In some such embodiments, the particular computing device may be configured with an agent process that may register with controller 106 in order to receive a memory allocation from disaggregated memory device 100. In some embodiments, the request may be issued from an administrator device or interface. In some such embodiments, the administrator device or interface may correspond to a single source from which requests to allocate memory to a set of computing devices may be issued and/or managed.

The request may include one or more unique identifiers for the particular computing device. For instance, the request may contain a NVMe Qualified Name ("NQN"). Controller 106 may assign the NQN to each registered computing device that is permitted to receive a memory allocation from disaggregated memory device 100. If the request does not contain the NQN, controller 106 may generate a unique NQN for the particular computing device, provided that the particular computing device (e.g., the IP address of the particular computing device) is within a permitted list of computing devices that may receive a memory allocation from disaggregated memory device 100. In some embodiments, controller 106 may generate a unique signature of the particular computing device based on a combination of identifiers included with the request. For instance, the unique signature may be based on a combination of the NQN, IP address, and/or other identifiers included in the header or body of the request message.

Process 300 may include verifying (at 304) that the request is associated with a registered computing device that is permitted to receive and access a memory allocation from disaggregated memory device 100. The verification (at 304) may involve determining that the NQN, IP address, and/or other identifiers from the request identify a device within a list of registered devices.

Process 300 may include determining (at 306) whether the specified amount of memory from the request is available and/or may be allocated to the particular computing device. In some embodiments, controller 106 may query the available memory pool of disaggregated memory device 100 for the specified amount of memory. In some other embodiments, controller 106 may determine the total amount of memory within disaggregated memory device 100 that is available for allocation upon initialization, may track prior allocations of memory to other devices, and may determine the current available memory based on the difference between the total amount of memory and the tracked prior allocations.

In response to determining (at 306—No) that the specified amount of memory is unavailable for allocation to the particular computing device, process 300 may include denying (at 308) the request. Denying (at 308) the request may include providing a message to the particular computing device that the request cannot be fulfilled.

In response to determining (at 306—Yes) that the specified amount of memory is available for allocation to the particular computing device, process 300 may include selecting (at 310) an interconnect fabric and transport with which the particular computing device may access a memory allocation from disaggregated memory device 100. As noted above, the memory allocation request may specify one or more desired or preferred interconnect fabric and transport combinations that are supported by the particular computing device.

In some embodiments, controller 106 may select (at 310) the fastest and/or lowest latency interconnect fabric and transport combination specified in the memory allocation request provided that disaggregated memory device 100 also supports that combination. For example, the memory allocation request may indicate that TCP over Ethernet and RDMA over Ethernet are interconnect fabric and transport combinations supported by the particular computing device. Controller 106 may select (at 310) RDMA over Ethernet instead of TCP over Ethernet due to the lower latency that is associated with RDMA than TCP. As another example, the memory allocation request may indicate that RDMA over Ethernet and RDMA over InfiniBand are interconnect fabric and transport combinations supported by the particular computing device. Controller 106 may select (at 310) RDMA over InfiniBand instead of RDMA over Ethernet due to the faster performance, lower latency, and/or greater bandwidth associated with an InfiniBand connection than an Ethernet connection.

In some embodiments, controller 106 may issue a ping or other test messaging to ensure that disaggregated memory device 100 and the particular computing device are able to communicate using the specified interconnect fabric and transport combinations. For instance, if the requested transport is RDMA, controller 106 may query the Network Interface Card ("NIC") of the particular computing device to ensure that the NIC is RDMA capable. This may include confirming that the NIC is configured with the necessary modules, drivers, and/or other adapters, and that the RDMA adapters are paired to the physical link. Similarly, if the PCIe interconnect fabric is specified in the request, controller 106 may perform a query to determine whether the particular computing device is connected to the same PCI bus and/or PCI switch as disaggregated memory device 100, and/or to determine the latest PCIe version that is supported by the particular computing device and disaggregated memory device 100. In the event that one or more of the specified interconnect fabric and transport cannot be verified, controller 106 may deny the request, or may alter the request to default to the Ethernet fabric with TCP transport that any device submitting the memory allocation request is known to support.

Process 300 may include creating (at 312) a memory block device with the specified amount of memory from the available memory pool. Creating (at 312) the memory block device may include identifying a start address and an end address in the available memory pool that spans an amount of unallocated memory equal to the specified amount of memory from the request, and issuing a command to allocate that address range as a RAM disk or RAM drive. In some embodiments, controller 106 may use the RamDisk library to generate the memory block device as a virtual drive with access to the specified amount of memory from the memory pool of the disaggregated memory device 100.

Process 300 may include exposing (at 314) the memory block device as an NVMe target device (e.g., an emulated storage device that is accessed using the NVMe protocol) to the particular computing device. Exposing (at 314) the memory block device may include assigning a unique identifier to identify and/or access the memory block device. In some embodiments, controller 106 may assign a unique NQN to each created memory block device. Exposing (at 314) the memory block device may further include associating the memory block device to the particular computing device by linking the unique identifier (e.g., a first NQN) of the memory block device to the unique identifier of the particular computing device (e.g., a second NQN). For instance, controller 106 may generate an NVMe namespace for the memory block device (e.g., create a NQN for accessing the memory block device), may attach the NVMe namespace to a port that is associated with the specified interconnect fabric that will be used to exchange data between the particular computing device and the memory block device, and may provide messaging to the particular computing device that it may access the memory block device by including the NQN of the memory block device in access requests issued over the selected interconnect fabric using the selected transport. The particular computing device may configure the NVMe target device as an extension of the local RAM or memory that the OS of the particular computing system may use for computations or to store active applications, processes, and/or services, as a swap space for memory overflows and/or paging, and/or as a fast buffer or cache with unlimited P/E cycles for frequently accessed data.

Process 300 may include controlling (at 316) access to the memory block device. Controlling (at 316) access to the memory block device may include converting between the NVMe stack (e.g., first messaging, format, and/or protocol) used by the particular computing device to issue read and write requests to the memory block device over the specified interconnect fabric, and the RAM disk layer (e.g., second messaging, format, and/or protocol) with which to directly access and read or write to the memory block device. In some embodiments, controlling (at 316) access to the memory block device may further include verifying that the messages issued to the memory block device contain the correct NQNs. For instance, if another device attempts to access the memory block device allocated to the particular computing device, controller 106 may identify that the NQN of the other device is different than the NQN of the particular computing device associated with the memory block device, and may reject or deny the request. Similarly, if the particular computing device attempts to access another memory block device that is not associated with the particular computing device, controller 106 may determine that the NQN of the particular computing device is not associated with the NQN of the other memory block device, and may prevent the particular computing device from accessing or modifying the other memory block device.

In some embodiments, controlling (at 316) access may include monitoring and/or metering usage of the memory block device. In some embodiments, controlling (at 316) access may include queuing or regulating access to different allocated memory block devices based on different configured policies. For instance, controller 106 may configure an access policy to for each created memory block devices. Controller 106 may use the policies to prioritize access to different memory block devices during times of congestion or when multiple computing devices attempt to access the different memory block devices at the same time. For instance, rather than issue the read and write requests from different computing devices to different memory block devices in a first-in-first-out ("FIFO") basis, controller 106 may buffer or temporarily delay requests directed to low priority memory block devices until requests directed to high priority memory block devices are executed. A high priority policy may be associated with a first memory block device that is associated with a first computing device providing performance critical tasks and/or that is associated with a premium subscriber, and a low priority policy may be associated with a second memory block device that is associated with a second computing device providing ordinary tasks and/or that is associated a freemium user or non-paying subscriber.

In some embodiments, the policies may be dynamically modified based on monitored memory block device usage rates. For example, a first memory block device may be the target for 70% of the total access requests or data sent to disaggregated memory device 100, and a second memory block device may be the target for 10% of the total access requests or data sent to disaggregated memory device 100. In this example, controller 106 may assign a higher priority to the second memory block device than to the first memory block device in order to balance performance and/or usage, and to prevent disproportionate access to the first memory block device at the expense of the second memory block device during times of congestion or heavy load.

Figure 4:
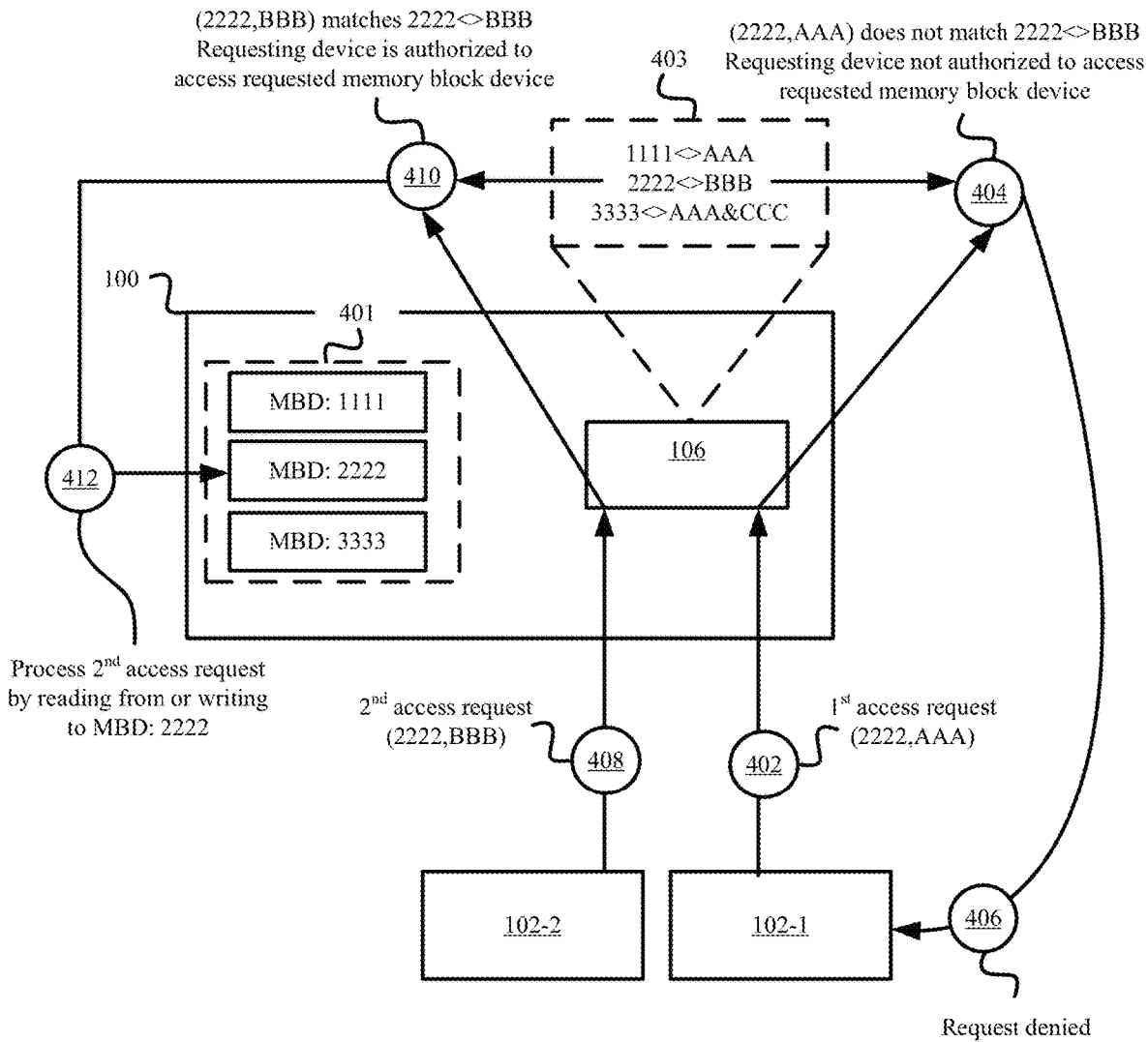
FIG. 4 illustrates an example of controlling access to the memory block devices in accordance with some embodiments presented herein.

FIG. 4 illustrates an example of controlling access to the memory block devices in accordance with some embodiments presented herein. As shown in FIG. 4, controller 106 may have created different memory block devices 401 for access by different computing devices, and may store or may be configured with mapping 403 that maps between NQNs of memory block devices 401 and NQNs associated with computing devices that are authorized to access each of memory block devices 401.

Controller 106 may receive (at 402) a first access request that includes a NQN associated with first computing device 102-1 and a NQN associated with a particular memory block device. Controller 106 may query mapping 403, and may determine (at 404) that the NQN associated with first computing device 102-1 is not linked to the NQN associated with the particular memory block device, and that the requestor is therefore not authorized to read from or write to the particular memory block device. Controller 106 may discard the first access request, or may issue (at 406) an access request failure message to the requestor.

Controller 106 may receive (at 408) a second access request that includes a NQN associated with second computing device 102-2 and the NQN associated with the particular memory block device. Controller 106 may query mapping 403, and may determine (at 410) that the NQN associated with second computing device 102-2 is linked to the NQN associated with the particular memory block device, and that the requestor is therefore authorized to read from or write to the particular memory block device. Accordingly, controller 106 process (at 412) the second access request by reading data from a specified sector or address of the particular memory block device, or by writing data to a specified sector or address of the particular memory block device.

In some embodiments, controller 106 may dynamically scale up or down the amount of memory that is allocated to a particular memory block device depending on usage of that particular memory block device. For instance, controller 106 may determine that the computing device associated with the particular memory block device has used all allocated memory and is frequently overwriting data across the particular memory block device. In some such embodiments, controller 106 may query the memory pool to determine if additional memory may be added to the particular memory block device. Specifically, controller 106 may query the memory pool to determine if unallocated memory that is sequentially before the start address or after the end address of the particular memory block device is available. If the memory is available, controller 106 may expand the particular memory block device by adjusting the start address or the end address to incorporate the additional memory. Alternatively, controller 106 may create and associate a second memory block device to the computing device to increase the amount of memory that is available to the computing device.

In some embodiments, controller 106 may monitor memory usage within the created memory block devices, and may determine that some amount of memory from a particular memory block device is unused or that the amount of data written to the particular memory block device is less than a threshold amount. When the amount of memory in the available memory pool falls below a threshold, controller 106 may scale down the amount of memory that is allocated to the particular memory block device. In some embodiments, scaling down the memory allocation may include temporarily halting access to the particular memory block device, creating a second memory block device that is smaller in size than the particular memory block device, copying the data from the particular memory block device to the second memory block device, changing the memory block device association of the computing device from the particular memory block device to the second memory block device, and allowing the computing device to seamlessly resume accessing data from the second memory block device instead of the particular memory block device. Controller 106 may then delete or free the memory from the particular memory block device.

In some embodiments, the system architecture may include multiple disaggregated memory devices. The computing devices may receive one or more memory allocations from one or more of the multiple disaggregated memory devices. In some such embodiments, each disaggregated memory device may be associated with its own unique identifier. The computing devices may request a memory allocation from the different disaggregated memory devices by issuing the request with the unique identifier of a particular disaggregated memory device, and/or may access a particular memory block device of a particular disaggregated memory device by providing the NQNs that associate the particular memory block device to the computing device, and by also including the unique identifier of the particular disaggregated memory device in the messaging issued to access the particular memory block device.

Figure 5:
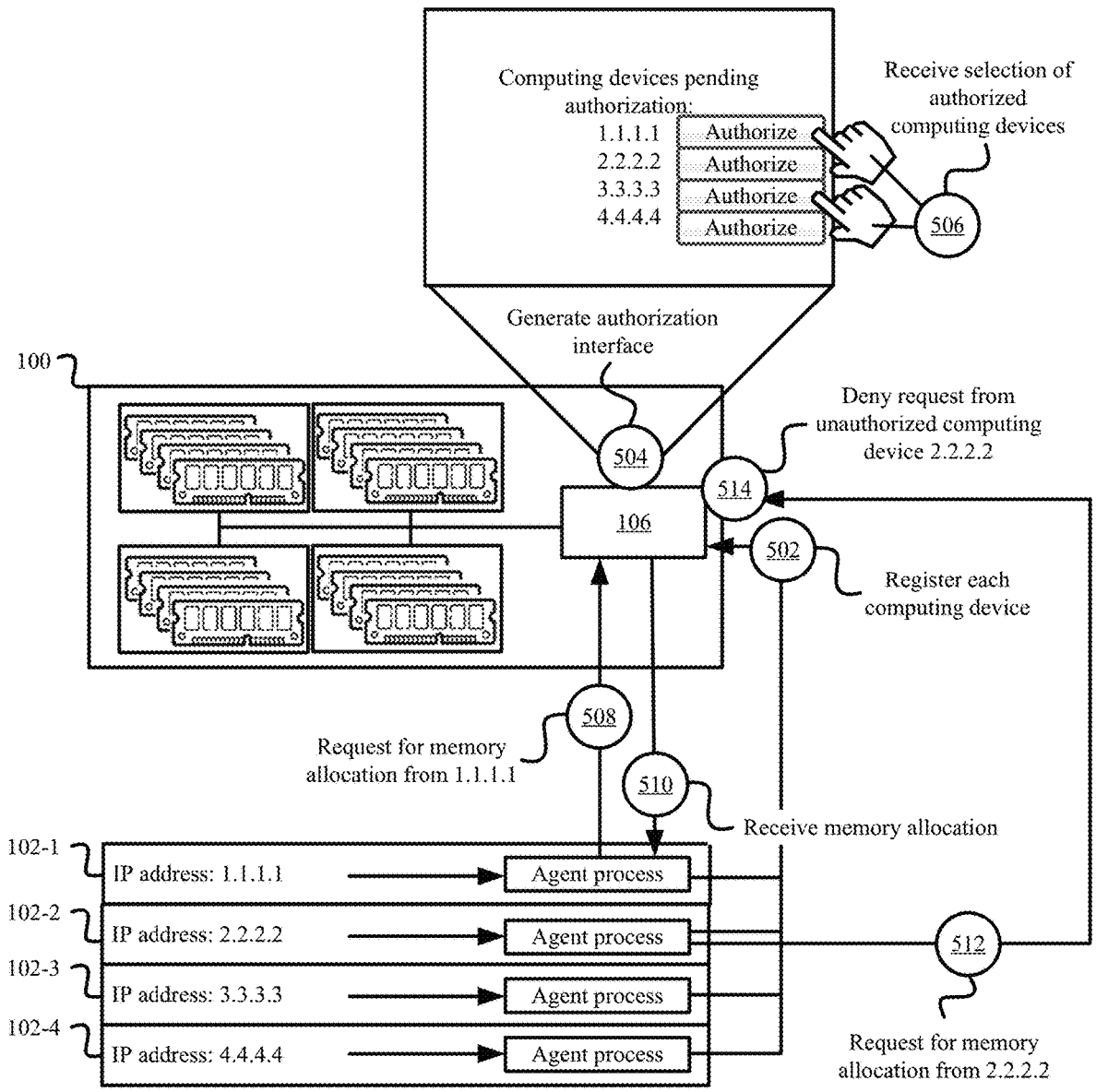
FIG. 5 illustrates an example of authorizing different computing devices for access to the disaggregated memory device in accordance with some embodiments presented herein.

In some embodiments, controller 106 may implement additional security measures to authorize a computing device's access to an associated and/or linked memory block device, and to prevent access to the memory block devices by unauthorized computing devices (e.g., computing devices that are not associated with those memory block devices). FIG. 5 illustrates an example of authorizing different computing devices for access to disaggregated memory device 100 in accordance with some embodiments presented herein.

As shown in FIG. 5, each computing device 102-1, 102-2, 102-3, and 102-4 may be configured with an agent process. The agent process may register (at 502) with disaggregated memory device 100 and/or controller 106 at bootup or in response to specified events. The registration (at 502) may include each agent process sending identifying information about the associated computing device 102 to controller 106. The identifying information may include the network address of the associated computing device 102, the device name, the amount of local memory present on the computing device 102, and/or other information from which to create a unique signature for the computing device 102 that is associated with the registering agent process. In some embodiments, the agent processes may be configured with the network address of disaggregated memory device 100, or may automatically discover disaggregated memory device 100 on a network via one or more techniques.

Controller 106 may generate (at 504) a portal or interface in response to the registration messaging collected from each computing device 102. The portal may include a selectable element for each computing device 102 that registered with controller 106, and/or may present the identifying information provided by the agent process for each registered computing device 102.

An administrator may select (at 506) which computing devices 102 to authorize for access to memory from disaggregated memory device 100. As shown in FIG. 5, the administrator may authorize first computing device 102-1 and third computing device 102-3. Second computing device 102-2 and fourth computing device 102-4 are not authorized for access to memory from disaggregated memory device 100. Controller 106 may generate and/or assign a unique NQN to each authorized computing device.

First computing device 102-1, via the agent process running on first computing device 102-1, may issue (at 508) a request for a memory allocation to controller 106. Controller 106 may receive (at 508) the request, may determine that first computing device 102-1 is authorized to receive the memory allocation, may create the memory block device for the requested memory allocation, and may expose (at 510) the memory block device to first computing device 102-1.

Controller 106 may also receive (at 512) a request for a memory allocation from second computing device 102-2. Controller 106 may determine that second computing device 102-2 is not authorized to receive a memory allocation from or to access disaggregated memory device 100. Accordingly, controller 106 may deny (at 514) the request from second computing device 102-2, and may prevent second computing device 102-2 from accessing disaggregated memory device 100 and/or any memory block devices of disaggregated memory device 100.

Figure 6:
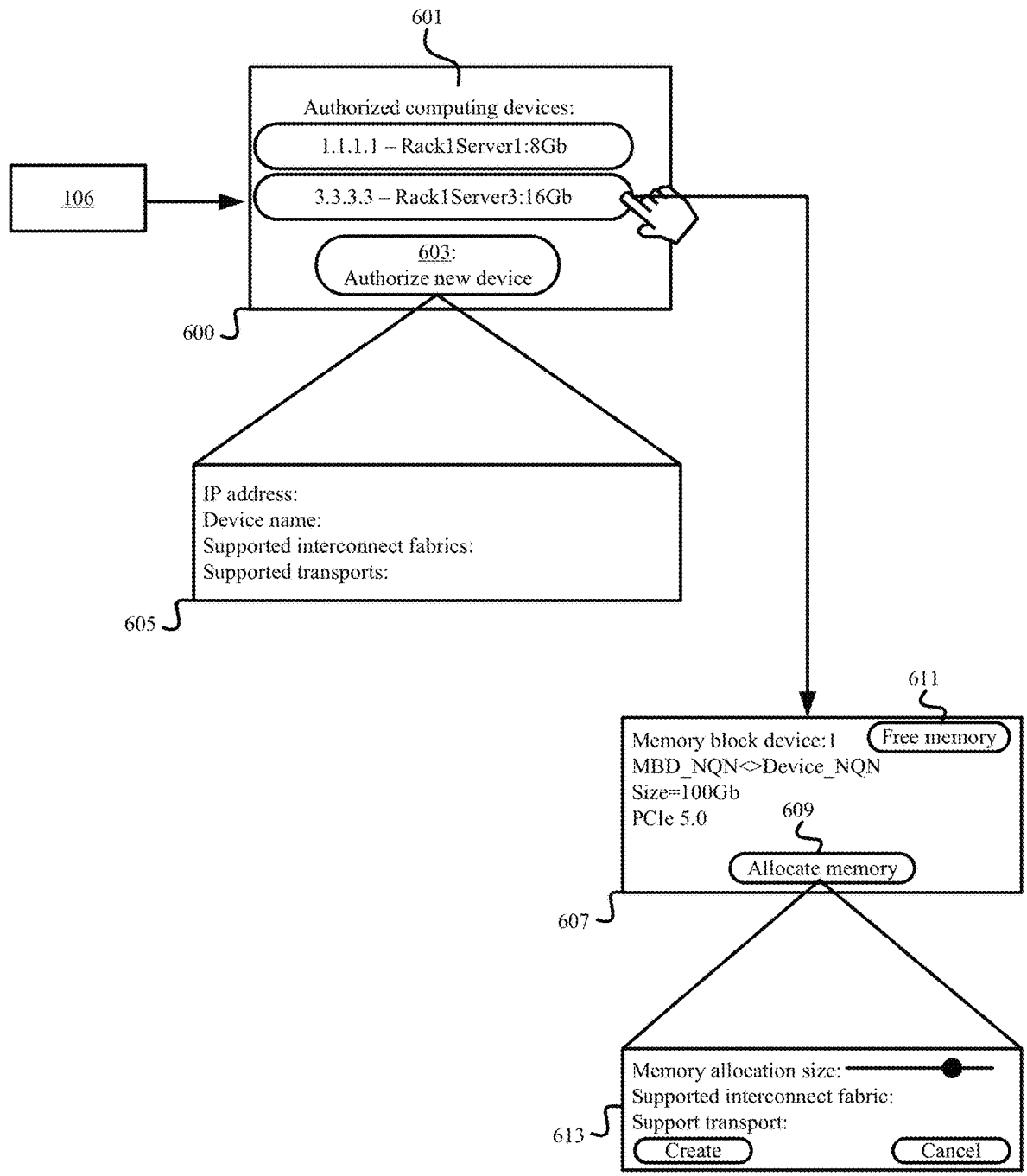
FIG. 6 illustrates an example graphical user interface ("GUI") for registering and/or authorizing computing devices to receive a memory allocation or memory block device from the disaggregated memory device in accordance with some embodiments presented herein.

In some embodiments, the computing device registration and/or authorization may be implemented without the agent processes running on the computing devices 102. FIG. 6 illustrates an example graphical user interface ("GUI") 600 for registering and/or authorizing computing devices to receive a memory allocation or memory block device from disaggregated memory device 100 in accordance with some embodiments presented herein.

Controller 106 may generate GUI 600 in response to a request to access the portal or interface of controller 106. For instance, an administrator may direct a web browser or other application to a network address or Uniform Resource Locator ("URL") of disaggregated memory device 100, and controller 106 may provide GUI 600 in response.

GUI 600 may present a list of computing devices 601 that have been authorized to receive a memory allocation from disaggregated memory device 100. For instance, GUI 600 may present the IP address, device name, and/or other identifying information from which to create a unique signature for each authorized computing device.

GUI 600 may include selectable element 603 for authorizing a new computing device. In response to a selection of selectable element 603, controller 106 may modify GUI 600 to present fields 605 into which a user may enter the identifying information (e.g., network address, name, and/or unique signature), supported interconnected fabrics, supported transports, etc. for a new computing device to be authorized. In some embodiments, controller 106 may query the identified computing device based on a provided network address to ensure that it is reachable over a network before adding the computing device as an authorized computing device in the list of authorized computing devices 601. Once added as an authorized computing device, the authorized computing device may request, receive, and/or access a memory block device allocated from the memory pool of disaggregated memory device 100 over a specified interconnect fabric using a specified transport.

GUI 600 may also be used to track and/or define different memory allocations for different authorized computing devices. For instance, a user may select an authorized computing device, and GUI 600 may present memory allocation interface 607 for the selected computing device.

Memory allocation interface 607 may identify any memory block devices that have been allocated to the selected computing device. Memory allocation interface 607 may include selectable element 609 for defining a new memory allocation for the selected computing device, and selectable element 611 for removing or deleting an existing memory allocation.

In response to selection of selectable element 609, controller 106 may present GUI 613 with interactive fields for specifying an amount of memory to allocate for the selected computing device. Controller 106 may generate and/or expose new memory allocations to the selected computing device over a specified interconnect fabric using a specified transport based on the input received in GUI 613.

In some embodiments, a command line interface or Application Programming Interface ("API") may be used to programmatically authorize computing devices with disaggregated memory device 100 and/or define memory allocations for authorized computing devices. The command line interface or API may be a replacement for or may supplement GUI 600.

In some embodiments, access to the memory block devices and/or disaggregated memory device 100 may be further secured using encryption. The encryption may prevent attackers from emulating or copying the NQN and/or unique signature of an authorized device in order to gain unauthorized access to any memory block devices associated with that authorized device.

Figure 7:
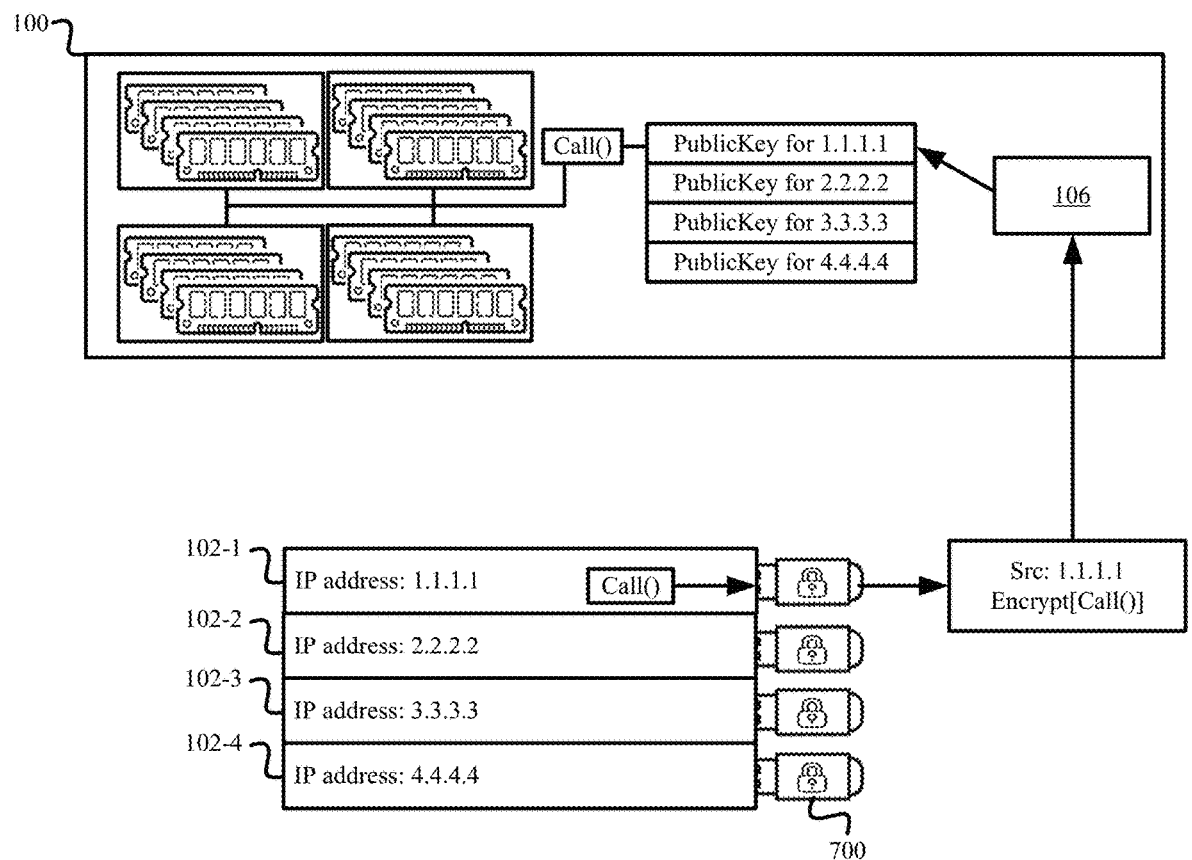
FIG. 7 illustrates an example of encrypting communications with disaggregated memory device in accordance with some embodiments presented herein.

FIG. 7 illustrates an example of encrypting communications with disaggregated memory device 100 in accordance with some embodiments presented herein. As shown in FIG. 7, encryption token 700 may be added to each computing device 102.

In some embodiments, encryption token 700 may be a physical dongle, module, or device that is attached to a physical port (e.g., a Universal Serial Bus ("USB") port) of a computing device 102. Each encryption token 700 may store a unique or different private key and cryptographic functions for encrypting the messaging, communications, and/or data exchanged with disaggregated memory device 100. In some embodiments, encryption token 700 may selectively encrypt the messaging, communications, and/or data over the NVMe port used to access an allocated memory block device.

During registration and/or authorization of a particular computing device 102 with disaggregated memory device 100, the corresponding public key for the private key of encryption token 700 used by that particular computing device 102 may be configured with controller 106 to allow controller 106 to decrypt the messaging from that particular computing device 102. Accordingly, if an attacking device was to emulate the identifiers and addressing of the particular computing device 102 and also copy all the software associated with accessing an allocated memory block device, the attacking device would be unable to correctly encrypt the messaging required to access the allocated memory block device. Controller 106 may prevent access to the memory block device in response to any requests that omit the correct NQNs or identifiers and that are not correctly encrypted with the private key from encryption token 700 that is registered to the particular computing device 102.

Figure 8:
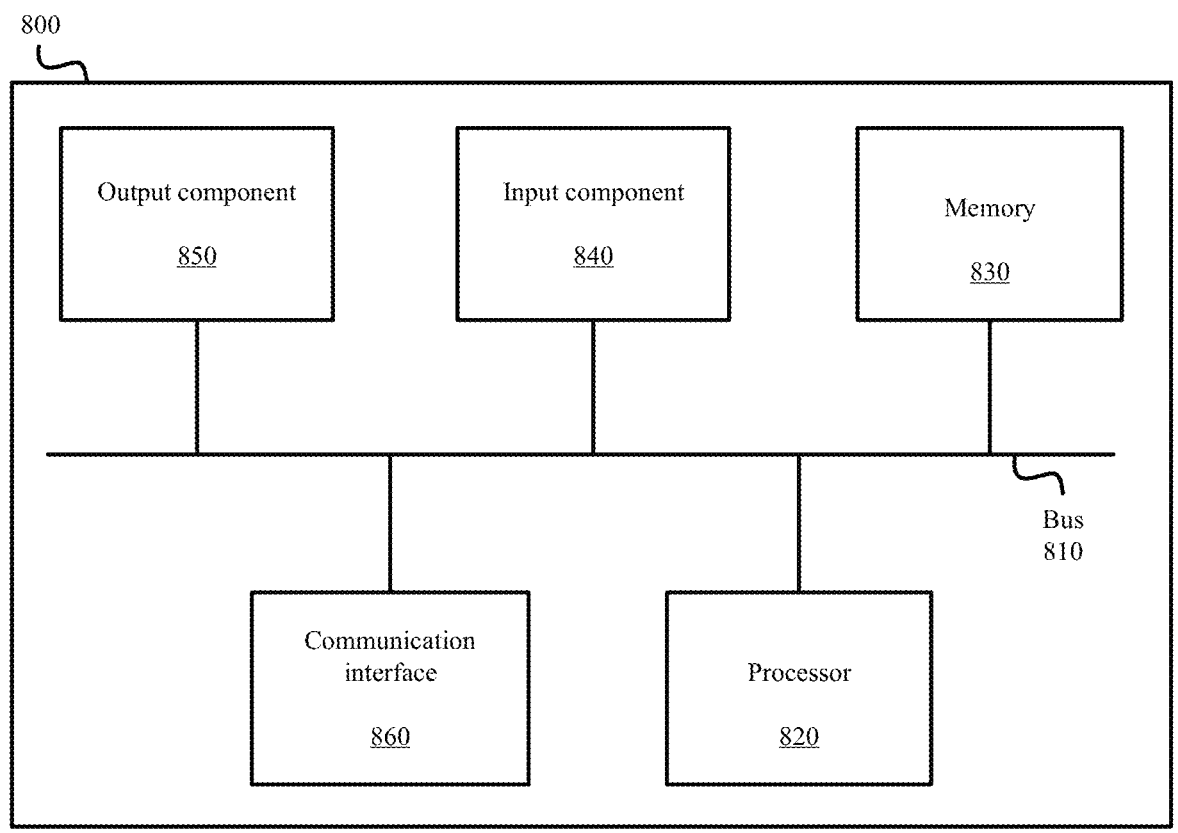
FIG. 8 illustrates example components of one or more devices, according to one or more embodiments described herein.

FIG. 8 is a diagram of example components of device 800. Device 800 may be used to implement one or more of the devices or systems described above (e.g., disaggregated memory device 100, computing devices 102, controller 106, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving a request for allocating volatile memory of a specific size from a disaggregated memory device to a computing device;
    generating a memory block device comprising the volatile memory of the specific size from a memory pool formed from a plurality of Random Access Memory ("RAM") modules configured on the disaggregated memory device;
    creating an emulated as a Non-Volatile Memory Express ("NVMe") target device through which the computing device accesses the memory block device, wherein creating the emulated NVMe target device comprises presenting the emulated NVMe target device as a non-volatile storage device to the computing device while configuring the emulated NVMe target device to read and write data using the volatile memory from the disaggregated memory device that is allocated to the memory block device; and
    controlling access to the volatile memory of the memory block device, wherein controlling the access comprises converting NVMe access requests in a first format from the computing device to access requests in a different second format supported by the memory block device and accessing the volatile memory from the memory block device in response to a first identifier of the computing device and a second identifier of the emulated NVMe target device from one or more of the NVMe access requests and the access requests in the different second format being linked together at the disaggregated memory device.

2. The method of claim 1, wherein controlling the access comprises:
    integrating the volatile memory from the memory block device of the disaggregated memory device into the computing device as one or more of an extension of local memory that is physically present on the computing device, a swap space for memory overflows occurring on the computing device, or a buffer with unlimited program/erase ("P/E") cycles.

3. The method of claim 1 further comprising:
- selecting one of a plurality of interconnect fabrics for accessing the disaggregated memory device based on one or more interconnect fabrics specified within the request; and
- linking the emulated NVMe target device to a port of a selected interconnect fabric.

4. The method of claim 3 further comprising:
- selecting one of a plurality of different transports for accessing the volatile memory from the memory block device over the selected interconnect fabric;
- determining that the disaggregated memory device and the computing device support a selected transport over the selected interconnect fabric; and
- providing access to the volatile memory of the memory block device based on messaging of the selected transport issued over the selected interconnect fabric.

5. The method of claim 1 further comprising:
- determining a performance associated with each of a plurality of interconnect fabrics that connect the disaggregated memory device to the computing device, wherein the plurality of interconnect fabrics comprises two or more of an Ethernet fabric, an InfiniBand fabric, a Fibre Channel fabric, and a Peripheral Component Interconnect express ("PCIe") fabric; and
- providing the computing device access to the volatile memory from the memory block device via a particular interconnect fabric that has faster performance than other interface fabrics of the plurality of interconnect fabrics.

6. The method of claim 1 further comprising:
- determining that the computing device and the disaggregated memory device support Transmission Control Protocol ("TCP") transport and Remote Direct Memory Access ("RDMA") transport;
- selecting the RDMA transport over the TCP transport based on the RDMA transport providing faster access to the volatile memory of the memory block device than the TCP transport; and
- accessing the volatile memory from the memory block device in response to RDMA messaging from the computing device.

7. The method of claim 1, wherein creating the emulated NVMe target device comprises:
- assigning a unique NVMe Qualified Name ("NQN") to the emulated NVMe target device; and
- associating a NQN of the computing device to the NQN assigned to the emulated NVMe target device.

8. The method of claim 7, wherein controlling the access comprises:
- preventing access to the memory block device in response to an access request that does not contain the NQN of the computing device and the NQN assigned to the emulated NVMe target device; and
- performing a read or write from the volatile memory of the memory block device in response to an access request that contains the NQN of the computing device and the NQN assigned to the emulated NVMe target device.

9. The method of claim 1, wherein creating the emulated NVMe target device comprises:
- generating an NVMe namespace for the memory block device; and
- attaching the NVMe namespace to a port that is associated with a selected interconnect fabric connecting the disaggregated memory device to the computing device.

10. The method of claim 9, wherein controlling the access comprises:
- mapping from the NVMe namespace to memory addresses of the memory block device; and
- reading or writing to the volatile memory of the memory block device based on a mapping of an NVMe namespace address specified in an access request to a corresponding memory address of the memory block device.

11. The method of claim 1, wherein the memory block device corresponds to a RAM disk device, and wherein the emulated NVMe target device presents the RAM disk device as a remote storage device to the computing device.

12. The method of claim 1 further comprising:
- authorizing a plurality of computing devices for access to the memory pool of the disaggregated memory device;
- receiving a second request for allocating an amount of volatile memory from the disaggregated memory device to a second computing device;
- blocking the second request in response to the second computing device not being within the plurality of computing devices authorized to access the memory pool of the disaggregated memory device; and
- creating a second memory block device in response to the second computing device being within the plurality of computing devices authorized to access the memory pool of the disaggregated memory device.

13. The method of claim 1, wherein the computing device is a first computing device, the method further comprising:
- receiving a second request for allocating an amount of volatile memory from the disaggregated memory device to a second computing device that is different than the first computing device;
- generating a second memory block device from the memory pool of the disaggregated memory device in response to the second request;
- exposing the second memory block device to the second computing device as a second emulated NVMe target device; and
- providing simultaneous access to the memory block device created for the first computing device and the second memory block device created for the second computing device in response to access requests issued to the emulated NVMe target device by the first computing device and to the second emulated NVMe target device by the second computing device.

14. The method of claim 1 further comprising:
- registering each of a plurality of computing devices with the disaggregated memory device based on messaging provided from an agent process running on each computing device to the disaggregated memory device; and
- generating a user interface ("UI") comprising identifying information about each of the plurality of computing devices, and a selectable element with which to authorize one or more of the plurality of computing devices for access to the memory pool of the disaggregated memory device.

15. A disaggregated memory device comprising:
- a memory pool formed from a plurality of Random Access Memory ("RAM") modules; and
- one or more processors configured to:
  - receive a request for allocating volatile memory of a specific size from the memory pool to a computing device;
  - generate a memory block device comprising the volatile memory of the specific size from the memory pool;

create an emulated Non-Volatile Memory Express ("NVMe") target device through which the computing device accesses the memory block device, wherein creating the emulated NVMe target device comprises presenting the emulated NVMe target device as a non-volatile storage device to the computing device while configuring the emulated NVMe target device to read and write data using the volatile memory that is allocated to the memory block device; and control access to the volatile memory of the memory block device, wherein controlling the access comprises converting NVMe access requests in a first format from the computing device to access requests in a different second format supported by the memory block device and accessing the volatile memory from the memory block device in response to a first identifier of the computing device and a second identifier of the emulated NVMe target device from one or more of the NVMe access requests and the access requests in the different second format being linked together at the disaggregated memory device.

16. The disaggregated memory device of claim 15, wherein controlling the access comprises:

integrating the volatile memory from the memory block device into the computing device as one or more of an extension of local memory that is physically present on the computing device, a swap space for memory overflows occurring on the computing device, or a buffer with unlimited program/erase ("P/E") cycles.

17. The disaggregated memory device of claim 15, wherein the one or more processors are further configured to:

select one of a plurality of interconnect fabrics for accessing the disaggregated memory device based on one or more interconnect fabrics specified within the request; and link the emulated NVMe target device to a port of a selected interconnect fabric.

18. The disaggregated memory device of claim 17, wherein the one or more processors are further configured to:

select one of a plurality of different transports for accessing the volatile memory from the memory block device over the selected interconnect fabric;

determine that the disaggregated memory device and the computing device support a selected transport over the selected interconnect fabric; and provide access to the volatile memory of the memory block device based on messaging of the selected transport issued over the selected interconnect fabric.

19. The disaggregated memory device of claim 15, wherein the one or more processors are further configured to:

determine a performance associated with each of a plurality of interconnect fabrics that connect the disaggregated memory device to the computing device, wherein the plurality of interconnect fabrics comprises two or more of an Ethernet fabric, an InfiniBand fabric, a Fibre Channel fabric, and a Peripheral Component Interconnect express ("PCIe") fabric; and provide the computing device access to the volatile memory from the memory block device via a particular interconnect fabric that has faster performance than other interface fabrics of the plurality of interconnect fabrics.

20. A non-transitory computer-readable medium, storing a plurality of processor-executable instructions to:

receive a request for allocating volatile memory of a specific size from a disaggregated memory device to a computing device;

generate a memory block device comprising the volatile memory of the specific size from a memory pool formed from a plurality of Random Access Memory ("RAM") modules configured on the disaggregated memory device;

create an emulated Non-Volatile Memory Express ("NVMe") target device through which the computing device accesses the memory block device, wherein creating the emulated NVMe target device comprises presenting the emulated NVMe target device as a non-volatile storage device to the computing device while configuring the emulated NVMe target device to read and write data using the volatile memory from the disaggregated memory device that is allocated to the memory block device; and control access to the volatile memory of the memory block device, wherein controlling the access comprises converting NVMe access requests in a first format from the computing device to access requests in a different second format supported by the memory block device and accessing the volatile memory from the memory block device in response to a first identifier of the computing device and a second identifier of the emulated NVMe target device from one or more of the NVMe access requests and the access requests in the different second format being linked together at the disaggregated memory device.

* * * * *